United States Patent
Okano et al.

(10) Patent No.: US 11,739,761 B2
(45) Date of Patent: Aug. 29, 2023

(54) FLUID MACHINE HAVING A FOIL BEARING ARRANGEMENT

(71) Applicant: KABUSHIKI KAISHA TOYOTA JIDOSHOKKI, Aichi-ken (JP)

(72) Inventors: Yuki Okano, Aichi-ken (JP); Hiroshi Saito, Aichi-ken (JP); Yuki Endo, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 17/486,012

(22) Filed: Sep. 27, 2021

(65) Prior Publication Data
US 2022/0099102 A1  Mar. 31, 2022

(30) Foreign Application Priority Data
Sep. 30, 2020  (JP) .................. 2020-165338

(51) Int. Cl.
*F04D 29/046* (2006.01)
*F16C 17/02* (2006.01)
*F16C 33/08* (2006.01)
*F04D 29/057* (2006.01)
*F16C 17/04* (2006.01)
(Continued)

(52) U.S. Cl.
CPC ......... *F04D 29/046* (2013.01); *F04D 29/057* (2013.01); *F16C 17/024* (2013.01); *F16C 17/042* (2013.01); *F16C 33/08* (2013.01); *F04C 2240/40* (2013.01); *F04C 2240/54* (2013.01);
(Continued)

(58) Field of Classification Search
CPC .... F04D 29/046; F04D 29/057; F04D 29/056; F16C 17/024; F16C 17/042; F16C 33/08; F16C 17/24; F16C 2360/44; F04C 2240/40; F04C 2240/54
See application file for complete search history.

(56) References Cited

U.S. PATENT DOCUMENTS 4,262,975 A * 4/1981 Heshmat ............... F16C 17/024
384/119
2007/0164626 A1 7/2007 Taniguchi et al.
(Continued)

FOREIGN PATENT DOCUMENTS

JP   2011-017385 A  1/2011
WO  WO2013-024674 A1 2/2013

*Primary Examiner* — Dominick L Plakkoottam
*Assistant Examiner* — Paul W Thiede
(74) *Attorney, Agent, or Firm* — Greenblum & Bernstein, P.L.C.

(57) ABSTRACT

A fluid machine includes a rotary shaft, an operation body configured to discharge fluid by rotation of the rotary shaft, a housing accommodating the rotary shaft and the operation body, and a foil bearing disposed in the housing rotatably supporting the rotary shaft. The foil bearing includes a cylindrical bearing housing, a top foil between the bearing housing and the rotary shaft, and a bump foil between the bearing housing and the top foil and elastically supporting the top foil. The bearing housing has a protrusion protruding inwardly in a radial direction from the bearing housing. The protrusion includes an abutment surface configured to restrict deformation of the bump foil to an elastic range not to reach a plastic range by abutting against the top foil or the bump foil when the top foil is displaced outwardly in the radial direction of the bearing housing.

10 Claims, 6 Drawing Sheets

(51) Int. Cl.
    *F04D 29/056*     (2006.01)
    *F16C 17/24*     (2006.01)

(52) U.S. Cl.
    CPC ............ *F04D 29/056* (2013.01); *F16C 17/24* (2013.01); *F16C 2360/44* (2013.01)

(56) References Cited

U.S. PATENT DOCUMENTS

| | | | |
|---|---|---|---|
| 2007/0246002 A1* | 10/2007 | Taniguchi | F16C 17/24 123/246 |
| 2014/0169708 A1 | 6/2014 | Omori | |
| 2016/0333927 A1* | 11/2016 | Rimpel | F16C 17/024 |
| 2017/0089389 A1* | 3/2017 | Midoumae | F16C 33/101 |
| 2017/0343041 A1* | 11/2017 | Vogt | F16C 17/024 |
| 2020/0124087 A1* | 4/2020 | Omori | F16C 27/02 |
| 2020/0224714 A1* | 7/2020 | Omori | F16C 17/024 |
| 2020/0240464 A1* | 7/2020 | Lim | F16C 17/024 |

\* cited by examiner

FLUID MACHINE HAVING A FOIL BEARING ARRANGEMENT

CROSS-REFERENCE TO RELATED APPLICATION

This application claims priority to Japanese Patent Application No. 2020-165338 filed on Sep. 30, 2020, the entire disclosure of which is incorporated herein by reference.

BACKGROUND ART

The present disclosure relates to a fluid machine.

The fluid machine includes a rotary shaft, an operation body configured to discharge fluid by rotation of the rotary shaft, and a housing accommodating the rotary shaft and the operation body. A foil bearing disposed in the housing and rotatably supporting the rotary shaft is disclosed in, for example, International Publication No. WO2013/024674. The foil bearing includes a cylindrical bearing housing, a cylindrical top foil, and a cylindrical bump foil. The top foil is disposed between an inner peripheral surface of the bearing housing and the rotary shaft, and rotatably supports the rotary shaft without contact with the rotary shaft while the rotary shaft rotates. The bump foil is disposed between the inner peripheral surface of the bearing housing and the top foil, and elastically supports the top foil.

However, in such a fluid machine, if, for example, the bump foil is pressed to deform by the rotary shaft owing to vibrations of the rotary shaft to an extent to which the deformation exceeds the elastic range to enter the plastic range, the bump foil plastically deforms so that the foil bearing may fail to rotatably support the rotary shaft. If the foil bearing fails to rotatably support the rotary shaft, the reliability of the fluid machine deteriorates.

The present disclosure has been made in view of the above circumstances and is directed to providing a fluid machine that has an improved reliability.

SUMMARY

A fluid machine includes a rotary shaft, an operation body configured to discharge fluid by rotation of the rotary shaft, a housing accommodating the rotary shaft and the operation body, and a foil bearing disposed in the housing and rotatably supporting the rotary shaft. The foil bearing includes a bearing housing having a cylindrical shape, a top foil disposed between an inner peripheral surface of the bearing housing and the rotary shaft, and a bump foil disposed between the inner peripheral surface of the bearing housing and the top foil and elastically supporting the top foil. The bearing housing has a protrusion that protrudes inwardly in a radial direction of the bearing housing from the inner peripheral surface of the bearing housing. The protrusion includes an abutment surface configured to restrict deformation of the bump foil to an elastic range so as not to reach a plastic range by abutting against an outer surface of the top foil or an outer surface of the bump foil when the top foil is displaced outwardly in the radial direction of the bearing housing.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

An embodiment of a fluid machine according to the present disclosure will be described in the following paragraphs with reference to FIGS. 1 to 8. A centrifugal compressor is mounted on a fuel cell vehicle. The centrifugal compressor corresponds to the fluid machine of the embodiment. On the fuel cell vehicle, a fuel cell system configured to supply oxygen and hydrogen to fuel cells to generate electricity is mounted. Then, the centrifugal compressor compresses air including the oxygen supplied to the fuel cells. The air corresponds to fluid.

Figure 1:
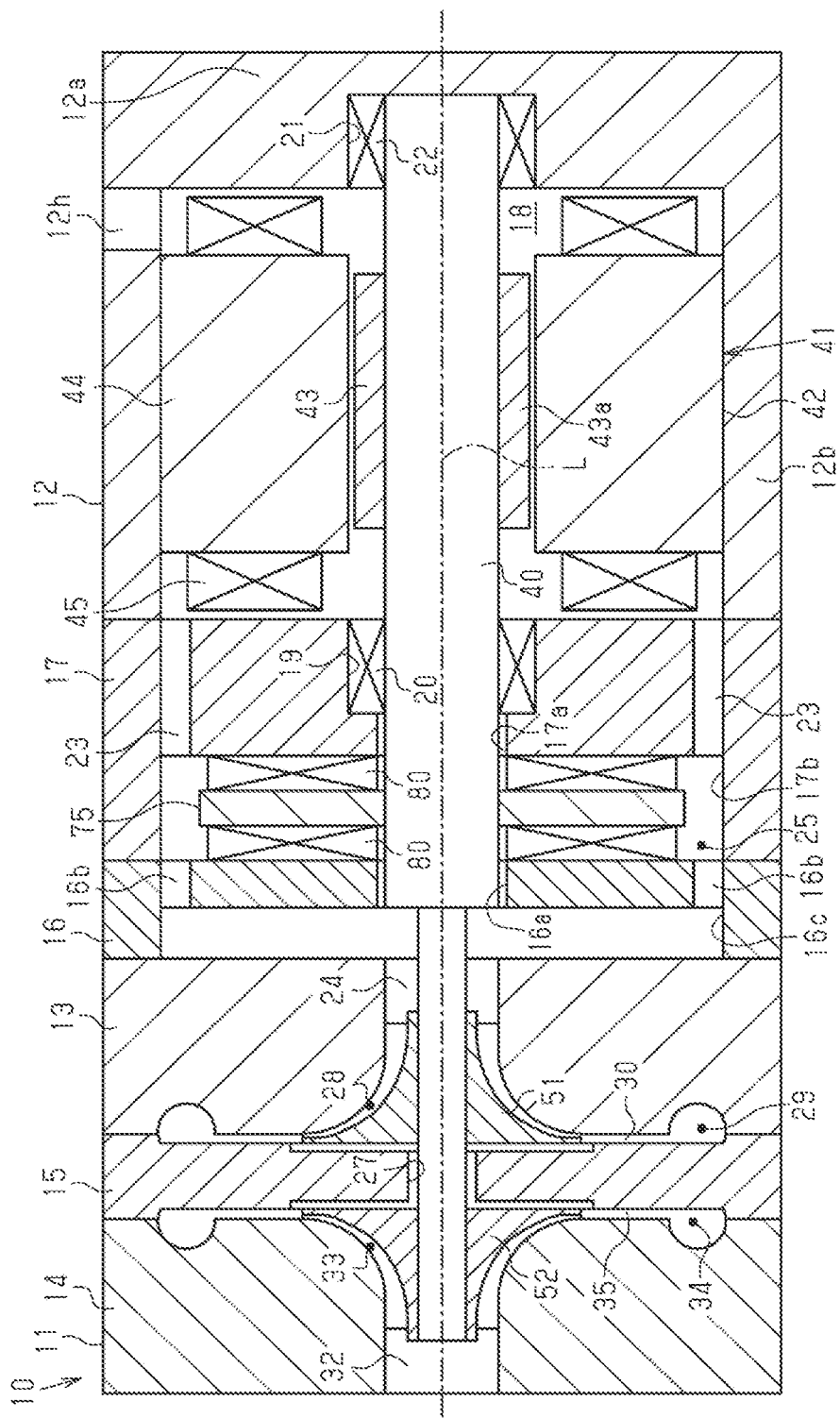
FIG. 1 is a sectional side view of a fluid machine according to an embodiment of the present disclosure.

As illustrated in FIG. 1, a centrifugal compressor 10 includes a housing 11 that has a cylindrical shape. The housing 11 includes a motor housing 12, a first compressor housing 13, a second compressor housing 14, a partition wall 15, a first intermediate housing 16, and a second intermediate housing 17. Each of the motor housing 12, the first compressor housing 13, the second compressor housing 14, the partition wall 15, the first intermediate housing 16, and the second intermediate housing 17 is made of metal such as aluminum.

The motor housing 12 has a bottomed cylindrical shape and includes an end wall 12a having a tabular shape and a peripheral wall 12b extending cylindrically from an outer periphery of the end wall 12a. The second intermediate housing 17 is connected to the motor housing 12 in a state where an opening of the second intermediate housing 17 on a side of the peripheral wall 12b opposite to the end wall 12a is closed. The end wall 12a and the peripheral wall 12b of the motor housing 12, and the second intermediate housing 17 define a motor chamber 18. An inlet hole 12h for taking in air is formed in the peripheral wall 12b at a position close to the end wall 12a. The inlet hole 12h communicates with the motor chamber 18. Therefore, air is taken into the motor chamber 18 through the inlet hole 12h.

The second intermediate housing 17 has a shaft insertion hole 17a in a central region of the second intermediate housing 17. The shaft insertion hole 17a is a circular hole.

The second intermediate housing 17 includes a first bearing holding portion 19 having a cylindrical shape. The first bearing holding portion 19 is formed in the central region of the second intermediate housing 17. An inside of the first bearing holding portion 19 communicates with the shaft insertion hole 17a. A central axis of the first bearing holding portion 19 coincides with a central axis of the shaft insertion hole 17a. The first bearing holding portion 19 holds a first foil bearing 20 corresponding to a foil bearing.

The end wall 12a of the motor housing 12 includes a second bearing holding portion 21 having a cylindrical shape. The second bearing holding portion 21 is formed in a central region of the end wall 12a of the motor housing 12. The central axis of the first bearing holding portion 19 coincides with a central axis of the second bearing holding portion 21. The second bearing holding portion 21 holds a second foil bearing 22 corresponding to the foil bearing. Therefore, the first foil bearing 20 and the second foil bearing 22 are disposed inside the housing 11. The foil bearing according to the embodiment includes the first foil bearing 20 and the second foil bearing 22.

The second intermediate housing 17 has a first chamber forming recess 17b formed in an outer surface of the second intermediate housing 17 on a side opposite to the motor chamber 18. The first chamber forming recess 17b communicates with the shaft insertion hole 17a. The second intermediate housing 17 also has a plurality of communication holes 23. The communication holes 23 are located at positions near an outer periphery of the second intermediate housing 17. The communication holes 23 extend through the second intermediate housing 17. The communication holes 23 provide communication between the motor chamber 18 and the first chamber forming recess 17b.

The first intermediate housing 16 is connected to the second intermediate housing 17 so as to close an opening of the first chamber forming recess 17b. The first intermediate housing 16 and the first chamber forming recess 17b of the second intermediate housing 17 define a thrust bearing accommodating chamber 25. The first intermediate housing 16 has a shaft insertion hole 16a in a central region of the first intermediate housing 16. The shaft insertion hole 16a is a circular hole.

The first intermediate housing 16 has a plurality of communication holes 16b. The communication holes 16b are located at positions near an outer periphery of the first intermediate housing 16. The communication holes 16b extend through the first intermediate housing 16. The first intermediate housing 16 has a second chamber forming recess 16c formed in an outer surface of the first intermediate housing 16 on a side opposite to the thrust bearing accommodating chamber 25. The second chamber forming recess 16c communicates with the shaft insertion hole 16a. The communication holes 16b provide communication between the thrust bearing accommodating chamber 25 and the second chamber forming recess 16c.

The first compressor housing 13 is cylindrical and has a first inlet 24 for taking in air. The first inlet 24 is a circular hole. The first compressor housing 13 is connected to the first intermediate housing 16 in a state where a central axis of the first inlet 24 coincides with a central axis of the shaft insertion hole 16a. The first inlet 24 communicates with the second chamber forming recess 16c.

The partition wall 15 is connected to an end surface of the first compressor housing 13 on a side opposite to the first intermediate housing 16. The partition wall 15 is tabular. The partition wall 15 has a through hole 27, which is a circular hole, in a central region of the partition wall 15. The through hole 27 extends through the partition wall 15 in a thickness direction of the partition wall 15. The partition wall 15 is connected to the first compressor housing 13 in a state where a central axis of the through hole 27 coincides with a central axis of the first inlet 24. The first inlet 24 faces the partition wall 15 in a direction in which the central axis of the first inlet 24 extends.

A first impeller chamber 28, a first discharge chamber 29, and a first diffuser flow passage 30 are formed between the partition wall 15 and the first compressor housing 13. The first impeller chamber 28 corresponds to an impeller chamber and communicates with the first inlet 24. The first discharge chamber 29 extends around the central axis of the first inlet 24 on a periphery of the first impeller chamber 28. The first diffuser flow passage 30 provides communication between the first impeller chamber 28 and the first discharge chamber 29.

The second compressor housing 14 is cylindrical and has a second inlet 32 for taking in air. The second inlet 32 is a circular hole. The second compressor housing 14 is connected to an end surface of the partition wall 15 on a side opposite to the first compressor housing 13 in a state where a central axis of the second inlet 32 coincides with the central axis of the first inlet 24. The second inlet 32 faces the partition wall 15 in a direction in which the central axis of the second inlet 32 extends.

A second impeller chamber 33, a second discharge chamber 34, and a second diffuser flow passage 35 are formed between the partition wall 15 and the second compressor housing 14. The second impeller chamber 33 corresponds to the impeller chamber and communicates with the second inlet 32. The second discharge chamber 34 extends around the central axis of the second inlet 32 on a periphery of the second impeller chamber 33. The second diffuser flow passage 35 provides communication between the second impeller chamber 33 and the second discharge chamber 34. Therefore, the housing 11 includes the first impeller chamber 28 and the second impeller chamber 33. The partition wall 15 partitions the first impeller chamber 28 and the second impeller chamber 33. The first discharge chamber 29 communicates with the second inlet 32 through a passage that is not illustrated.

The centrifugal compressor 10 includes a rotary shaft 40, and an electric motor 41 that rotates the rotary shaft 40. The electric motor 41 is accommodated in the motor chamber 18. The rotary shaft 40 extends in an axial direction of the housing 11, through an inside of the second bearing holding portion 21, the motor chamber 18, an inside of the first bearing holding portion 19, the shaft insertion hole 17a, the thrust bearing accommodating chamber 25, the shaft insertion hole 16a, the first inlet 24, the first impeller chamber 28, the through hole 27, the second impeller chamber 33, and the second inlet 32, in this order. Therefore, the rotary shaft 40 is disposed across the first impeller chamber 28 and the second impeller chamber 33, inserted through the through hole 27. An axis L of the rotary shaft 40 coincides with central axes of the first bearing holding portion 19, the second bearing holding portion 21, the shaft insertion hole 17a, the shaft insertion hole 16a, the first inlet 24, the through hole 27, and the second inlet 32. The rotary shaft 40 is accommodated in the housing 11 in this way. In the following description, an "axial direction of the rotary shaft 40" in which the axis L of the rotary shaft 40 extends may be referred to as a "thrust direction", and a "radial direction of the rotary shaft 40" may be referred to as a "radial direction".

The electric motor 41 includes a stator 42 and a rotor 43. The stator 42 includes a stator core 44 having a cylindrical shape, and a coil 45 wound around the stator core 44. The stator core 44 is fixed to an inner peripheral surface of the peripheral wall 12b of the motor housing 12. The rotor 43 is disposed inside the stator core 44 in the motor chamber 18. The rotor 43 rotates integrally with the rotary shaft 40. The rotor 43 includes a rotor core 43a fixed to the rotary shaft 40, and a plurality of permanent magnets (not illustrated) provided to the rotor core 43a. The rotor 43 rotates by power supplied to the coil 45 under control of an inverter that is not illustrated, and the rotary shaft 40 rotates integrally with the rotor 43.

The centrifugal compressor 10 includes a first impeller 51 and a second impeller 52 that correspond to operation bodies. The first impeller 51 and the second impeller 52 are made of, for example, aluminum. The stiffness of the aluminum material forming the first impeller 51 and the second impeller 52 is lower than the stiffness of the aluminum material forming the partition wall 15. The first impeller 51 and the second impeller 52 are connected to a first end portion of the rotary shaft 40. The second impeller 52 is disposed closer to the first end portion of the rotary shaft 40 than the first impeller 51 is. The first foil bearing 20 and the second foil bearing 22 are disposed closer to a second end portion of the rotary shaft 40 than the first impeller 51 and the second impeller 52 are.

The first impeller 51 is accommodated in the first impeller chamber 28. The first impeller 51 has a conical trapezoid shape. The first impeller 51 is connected to the first end portion of the rotary shaft 40. The second impeller 52 is accommodated in the second impeller chamber 33. The second impeller 52 has a conical trapezoid shape. The second impeller 52 is connected to the first end portion of the rotary shaft 40. The rotary shaft 40, the first impeller 51, and the second impeller 52 are accommodated in the housing 11 in this way.

The first foil bearing 20 and the second foil bearing 22 rotatably support the rotary shaft 40. The first foil bearing 20 and the second foil bearing 22 rotatably support the rotary shaft 40 in contact with the rotary shaft 40 until the number of rotations of the rotary shaft 40 reaches the number of floating rotations at which the rotary shaft 40 floats from the first foil bearing 20 and the second foil bearing 22 by operations of the first foil bearing 20 and the second foil bearing 22. When the number of rotations of the rotary shaft 40 reaches the number of floating rotations, the rotary shaft 40 floats away from the first foil bearing 20 and the second foil bearing 22 by dynamic pressures generated between the rotary shaft 40 and the first foil bearing 20 and between the rotary shaft 40 and the second foil bearing 22, so that the first foil bearing 20 and the second foil bearing 22 rotatably support the rotary shaft 40 without contact with the rotary shaft 40. Therefore, the first foil bearing 20 and the second foil bearing 22 are aerodynamic bearings that rotatably support the rotary shaft 40 in the radial direction.

A specific configuration of the first foil bearing 20 of the present embodiment will now be described below. Since the configuration of the second foil bearing 22 is identical with that of the first foil bearing 20, detailed descriptions of the configuration of the second foil bearing 22 will be omitted.

Figure 2:
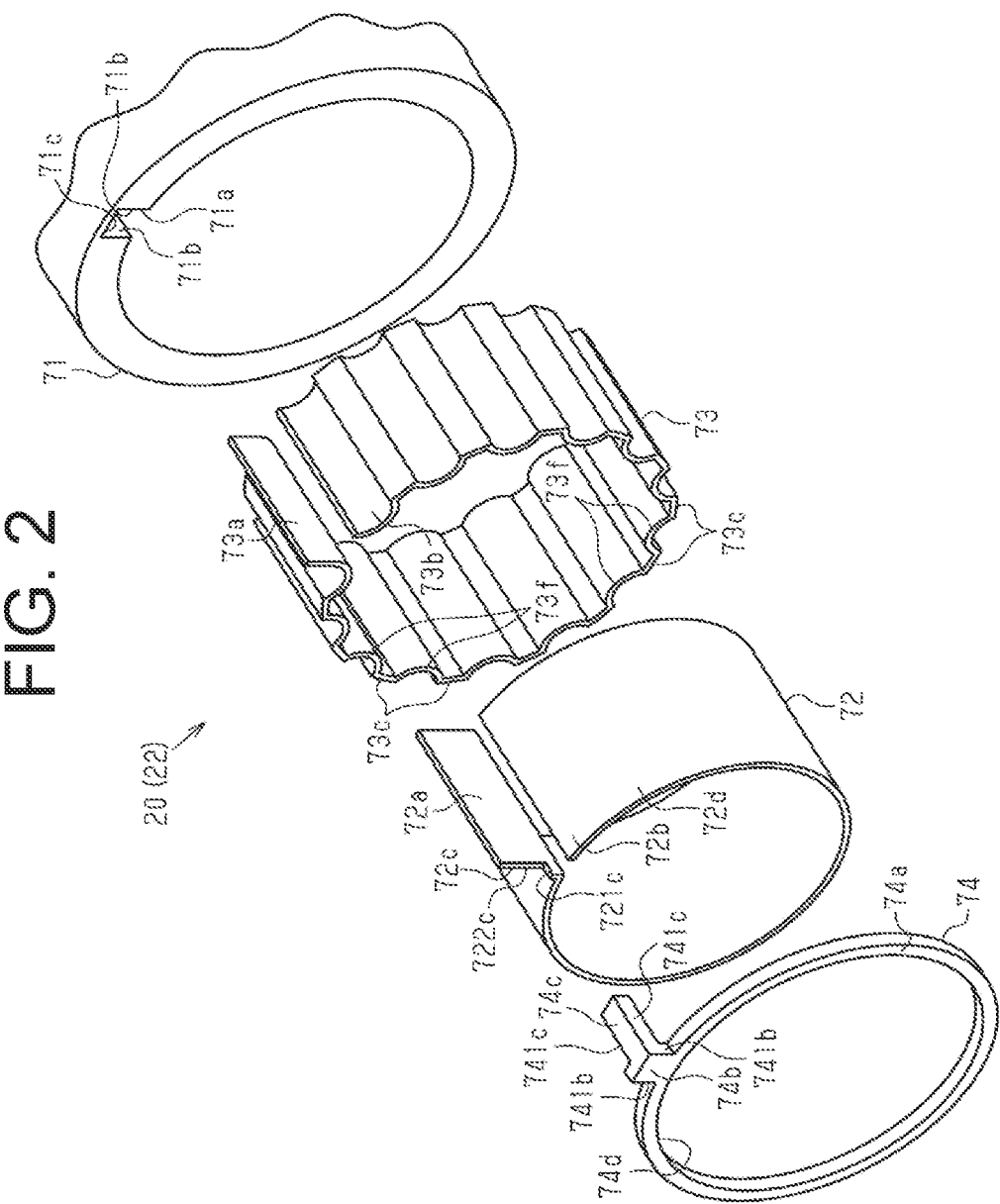
FIG. 2 is an exploded perspective view of a first foil bearing and a holding member.
Figure 3:
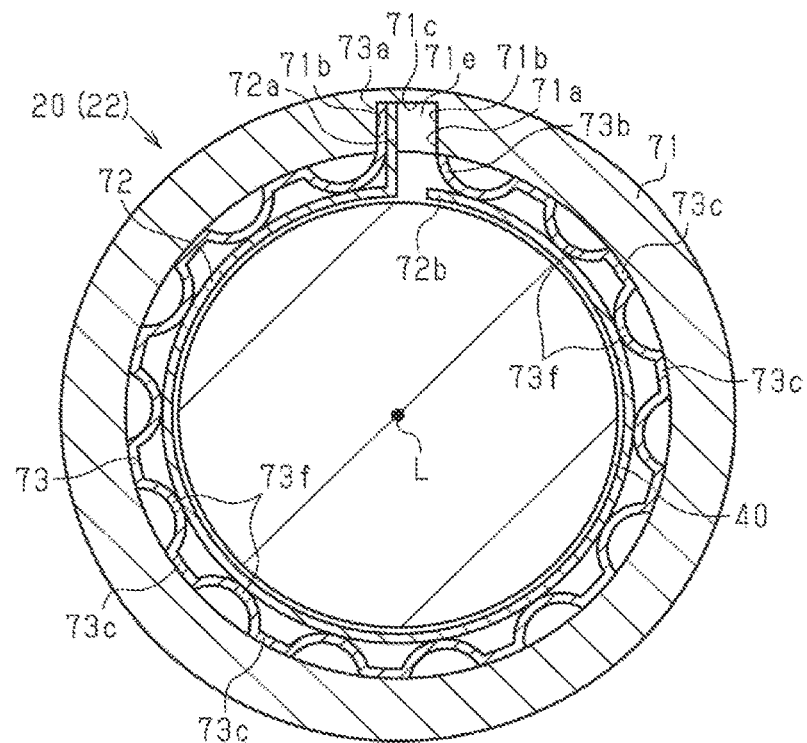
FIG. 3 is a longitudinal section view of the first foil bearing and a rotary shaft.

As illustrated in FIGS. 2 and 3, the first foil bearing 20 includes a bearing housing 71, a top foil 72, and a bump foil 73. The bearing housing 71 has a cylindrical shape. The bearing housing 71 has a holding groove 71a in an inner peripheral surface of the bearing housing 71. The holding groove 71a extends in an axial direction of the bearing housing 71.

The holding groove 71a has a pair of side surfaces 71b extending in the axial direction of the bearing housing 71. The pair of the side surfaces 71b are continuous with the inner peripheral surface of the bearing housing 71. The pair of the side surfaces 71b extends in parallel with each other. The holding groove 71a has an outward surface 71c extending in the axial direction of the bearing housing 71. The outward surface 71c connects both edges of the pair of the side surfaces 71b to each other on a side opposite to the inner peripheral surface of the bearing housing 71.

One end of the holding groove 71a in an axial direction is opened to one end surface of the bearing housing 71 in the axial direction. Therefore, the pair of the side surfaces 71b and the outward surface 71c are continuous with the one end surface of the bearing housing 71. The other end of the holding groove 71a in the axial direction is not opened to the other end surface of the bearing housing 71 in the axial direction, but is closed. Therefore, the other end of the holding groove 71a in the axial direction extends in a radial direction of the bearing housing 71 so as to be a stepped surface 71e continuous with the inner peripheral surface of the bearing housing 71. The pair of the side surfaces 71b and the outward surface 71c are continuous with the stepped surface 71e.

The top foil 72 has a substantially cylindrical shape. The top foil 72 is formed by, for example, bending a flexible belt-like shaped metal plate made of stainless steel or the like into the cylindrical shape with a longer side thereof in a circumferential direction and a shorter side thereof in an axial direction. One end portion of the top foil 72 in the circumferential direction, i.e., a fixed end portion 72a, is bent outwardly in a radial direction of the top foil 72. The other end portion of the top foil 72 in the circumferential direction, i.e., a free end portion 72b, faces a base end portion of the fixed end portion 72a in the circumferential direction, away from the base end portion. Therefore, the top foil 72 has an incomplete ring-shape with a part thereof cut out.

The top foil 72 is disposed inside the bearing housing 71 with the fixed end portion 72a inserted into the holding groove 71a. Therefore, a part of the top foil 72 is inserted into the holding groove 71a. The top foil 72 is disposed inside the bearing housing 71 with the fixed end portion 72a held in the holding groove 71a by inserting the fixed end portion 72a into the holding groove 71a. A part of the fixed end portion 72a overlaps with the stepped surface 71e in the axial direction of the bearing housing 71. The top foil 72 is disposed outside the rotary shaft 40 in the radial direction. The top foil 72 rotatably supports the rotary shaft 40 without contact with the rotary shaft 40 while the rotary shaft 40 rotates.

The bump foil 73 has a substantially cylindrical shape. The bump foil 73 is formed by, for example, bending a flexible belt-like shaped metal plate made of stainless steel or the like into the cylindrical shape with a longer side thereof in a circumferential direction and a shorter side thereof in an axial direction. A thickness of the top foil 72 is substantially the same as that of the bump foil 73. One end portion of the bump foil 73 in the circumferential direction, i.e., a fixed end portion 73a, is bent outwardly in a radial direction of the bump foil 73. The other end portion of the bump foil 73 in the circumferential direction, i.e., a free end portion 73b, faces a base end portion of the fixed end portion 73a in the circumferential direction, away from the base end portion. Therefore, the bump foil 73 includes the fixed end portion 73a and the free end portion 73b and has an incomplete ring-shape with a part thereof cut out.

The bump foil 73 is disposed inside the bearing housing 71 with the fixed end portion 73a inserted into the holding groove 71a. Therefore, a part of the bump foil 73 is inserted into the holding groove 71a. The bump foil 73 is disposed inside the bearing housing 71 with the fixed end portion 73a held in the holding groove 71a by inserting the fixed end portion 73a into the holding groove 71a. A part of the fixed end portion 73a overlaps with the stepped surface 71e in the axial direction of the bearing housing 71. The bump foil 73 is disposed between the inner peripheral surface of the bearing housing 71 and the top foil 72. Therefore, the bump foil 73 is disposed outside the top foil 72 in the radial direction. Then, the bump foil 73 elastically supports the top foil 72.

The bump foil 73 includes a plurality of bottom portions 73c that is in contact with the inner peripheral surface of the bearing housing 71. The bottom portions 73c extend along the inner peripheral surface of the bearing housing 71. The bump foil 73 also includes a plurality of raised portions 73f in contact with an outer peripheral surface of the top foil 72 corresponding to an outer surface of the top foil 72. Each of the raised portions 73f protrudes in a direction away from the inner peripheral surface of the bearing housing 71 and is also curved in an arc so as to raise toward the outer peripheral surface of the top foil 72. The bump foil 73 has a corrugated shape in which the bottom portions 73c and the raised portions 73f are alternately arranged in the circumferential direction of the bump foil 73. The circumferential direction of the bump foil 73 coincides with the circumferential direction of the bearing housing 71. Therefore, the bump foil 73 has a configuration in which the bottom portions 73c and the raised portions 73f are alternately arranged from the fixed end portion 73a of the bump foil 73 toward the free end portion 73b of the bump foil 73 in the circumferential direction of the bearing housing 71.

A length of the top foil 72 in the axial direction is shorter than a length of the bearing housing 71 in the axial direction. A length of the bump foil 73 in the axial direction is shorter than a length of the top foil 72 in the axial direction. An end portion of the top foil 72 on one side thereof in the axial direction protrudes from an end portion of the bump foil 73 on one side thereof in the axial direction. The end portion of the top foil 72 on the one side thereof in the axial direction extends in the axial direction of the bearing housing 71 longer than the end portion of the bump foil 73 on the one side thereof in the axial direction, which forms a non-overlapped portion 72d. The non-overlapped portion 72d is not overlapped with the bump foil 73 in the radial direction of the bearing housing 71.

The top foil 72 includes a cutout 72c at an end edge of the fixed end portion 72a of the top foil 72 on one side of the top foil 72 in the axial direction. The cutout 72c includes a first edge 721c extending from the end edge of the fixed end portion 72a of the top foil 72 on the one side of the top foil 72 in the axial direction of the top foil 72, and a second edge 722c continuous with the first edge 721c and extending outwardly in the radial direction of the top foil 72 from the first edge 721c. An edge of the second edge 722c on a side opposite to the first edge 721c continues with an end edge of the fixed end portion 72a of the top foil 72 on the radially outer side of the top foil 72.

A length from the second edge 722c to the end edge of the fixed end portion 72a of the top foil 72 on the other side of the top foil 72 in the axial direction is identical with the length of the bump foil 73 in the axial direction. The length of the fixed end portion 72a of the top foil 72 from the second edge 722c to the end edge of the fixed end portion 72a of the top foil 72 on the other side of the top foil 72 in the axial direction is identical with a length of the fixed end portion 73a of the bump foil 73 in the axial direction of the bump foil 73.

When the rotary shaft 40 does not rotate, the bottom portions 73c of the bump foil 73 come in contact with the inner peripheral surface of the bearing housing 71 and the raised portions 73f of the bump foil 73 come in contact with the outer peripheral surface of the top foil 72. When the rotary shaft 40 rotates, the top foil 72 elastically deforms outwardly in the radial direction, so that air enters into a space between the rotary shaft 40 and the top foil 72 to form an air layer, which generates a dynamic pressure. As a result, the rotary shaft 40 is rotatably supported by the top foil 72 via the air layer, without contact with the top foil 72.

When the top foil 72 elastically deforms outwardly in the radial direction by the air layer formed between the rotary shaft 40 and the top foil 72, the raised portions 73f of the bump foil 73 in contact with the outer peripheral surface of the top foil 72 are pressed by the top foil 72 so that the bump foil 73 elastically deforms outwardly in the radial direction together with the top foil 72 accordingly. In this way, the bump foil 73 elastically supports the top foil 72. The raised portions 73f are elastically deformed along with outward displacement of the top foil 72 in the radial direction of the bearing housing 71.

Figure 4:
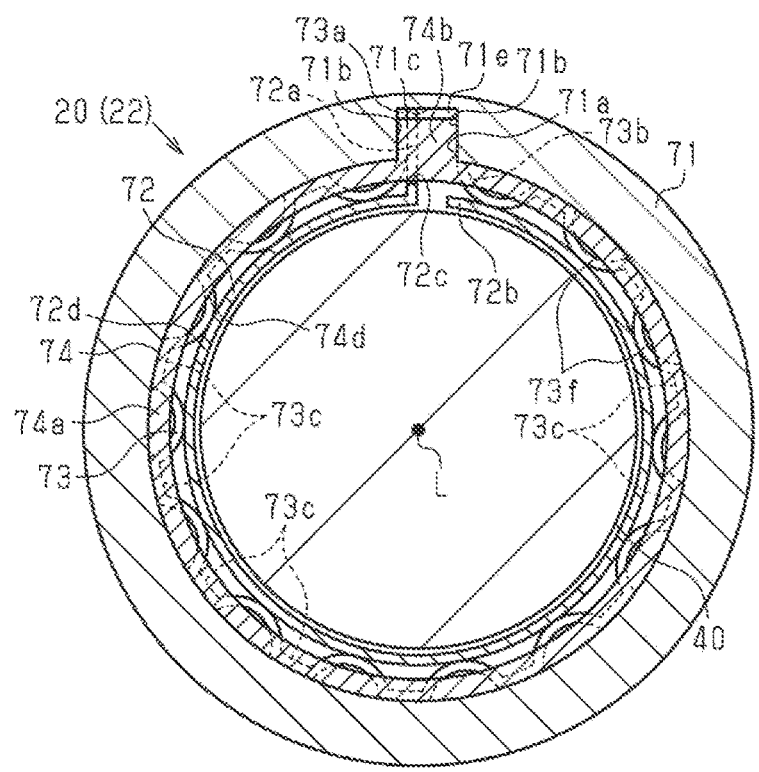
FIG. 4 is a longitudinal section view of the first foil bearing, the holding member, and the rotary shaft.

As illustrated in FIGS. 2 and 4, the centrifugal compressor 10 includes a holding member 74. The holding member 74 includes a main body 74a, a fixed portion 74b, and a rotation stopper 74c. The main body 74a has a circular ring shape. An outer diameter of the main body 74a is slightly smaller than an inner diameter of the bearing housing 71. An inner diameter of the main body 74a is larger than an outer diameter of the top foil 72. A thickness of the main body 74a is larger than those of the top foil 72 and the bump foil 73.

Figure 5:
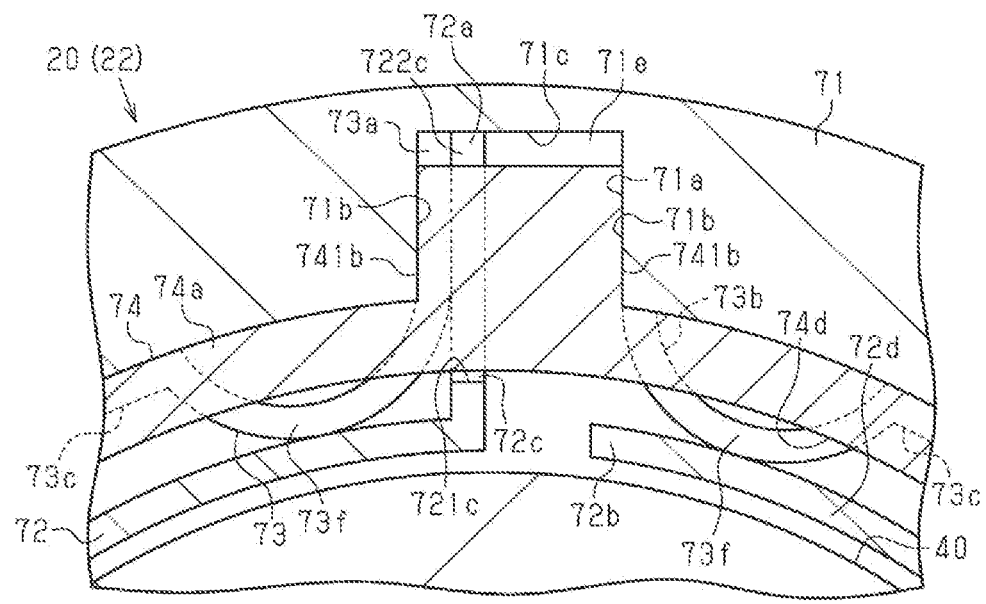
FIG. 5 is a detailed section view of a holding groove and surrounding parts.

As illustrated in FIG. 5, the fixed portion 74b protrudes outwardly from an outer peripheral surface of the main body 74a. The fixed portion 74b is disposed in the holding groove 71a. The fixed portion 74b includes a pair of contact surfaces 741b on both sides of the fixed portion 74b in a circumferential direction of the main body 74a. The contact surfaces 741b extend along the respective side surfaces 71b of the holding groove 71a. The fixed portion 74b is press-fitted into and fixed in the holding groove 71a in a state with the contact surfaces 741b in contact with the respective side surfaces 71b of the holding groove 71a. The holding member 74 is disposed inside the bearing housing 71 with the fixed portion 74b press-fitted into and fixed in the holding groove 71a.

In a state where the holding member 74 is disposed inside the bearing housing 71 as illustrated in FIGS. 2 and 4, the outer peripheral surface of the main body 74a is in contact with the inner peripheral surface of the bearing housing 71 at an end of an opening of the bearing housing 71 on one side of the bearing housing 71 in the axial direction. The main body 74a is disposed at the opening of the bearing housing 71 on the one side of the bearing housing 71 in the axial direction. Parts of the main body 74a are disposed at positions corresponding to all the respective raised portions 73f in the inner peripheral surface of the bearing housing 71 when viewed in the axial direction of the bearing housing 71. Therefore, the main body 74a is a protrusion that protrudes inwardly in the radial direction of the bearing housing 71 from the inner peripheral surface of the bearing housing 71. The protrusion has a ring shape and extends over an entire circumference of the inner peripheral surface of the bearing housing 71. One of the parts of the main body 74*a* is disposed at a position corresponding to one of the raised portions 73*f* positioned on a side close to the free end portion 73*b* of the bump foil 73 in the inner peripheral surface of the bearing housing 71 when viewed in the axial direction of the bearing housing 71.

An inner peripheral surface of the main body 74*a* serves as an abutment surface 74*d* that is configured to restrict deformation of the bump foil 73 to the elastic range so as not to reach the plastic range by abutting against the outer peripheral surface of the top foil 72 when the top foil 72 is displaced outwardly in the radial direction of the bearing housing 71. Therefore, the main body 74*a* has the abutment surface 74*d*. The abutment surface 74*d* is formed in an arc so as to extend along a shape of the top foil 72 when the top foil 72 is displaced.

As illustrated in FIG. 5, one portion of the main body 74*a* is located on the radially outer side of the top foil 72 with respect to the first edge 721*c* of the cutout 72*c*. Most portions of the main body 74*a* is located on the radially outer side of the top foil 72 with respect to the end portion of the outer peripheral surface of the top foil 72 on the one side of the top foil 72 in the axial direction. The one portion of the main body 74*a* overlaps with the second edge 722*c* of the cutout 72*c* and the fixed end portion 73*a* of the bump foil 73 in the axial direction of the bearing housing 71 when viewed in the axial direction of the bearing housing 71. Therefore, the one portion of the main body 74*a* overlaps with the part of the top foil 72 and the part of the bump foil 73 in the axial direction of the bearing housing 71. The main body 74*a* is disposed adjacent to the bump foil 73 in the axial direction. The main body 74*a* is disposed between an outer peripheral surface of the non-overlapped portion 72*d* of the top foil 72 and the inner peripheral surface of the bearing housing 71. The outer peripheral surface of the non-overlapped portion 72*d* of the top foil 72 corresponds to an outer surface of the non-overlapped portion 72*d*.

As illustrated in FIG. 2, the rotation stopper 74*c* has a shape of an elongated quadrangular prism extending from the fixed portion 74*b* in the axial direction of the holding member 74. Therefore, the rotation stopper 74*c* is formed integrally with the main body 74*a* via the fixed portion 74*b*. The rotation stopper 74*c* includes a pair of sandwiching surfaces 741*c* on both sides of the rotation stopper 74*c* in a circumferential direction of the main body 74*a*. A width between the pair of the sandwiching surfaces 741*c* is smaller than a width between the pair of the contact surfaces 741*b*. One of the pair of the sandwiching surfaces 741*c* and one of the pair of the contact surfaces 741*b* are flush with each other.

Figure 6:
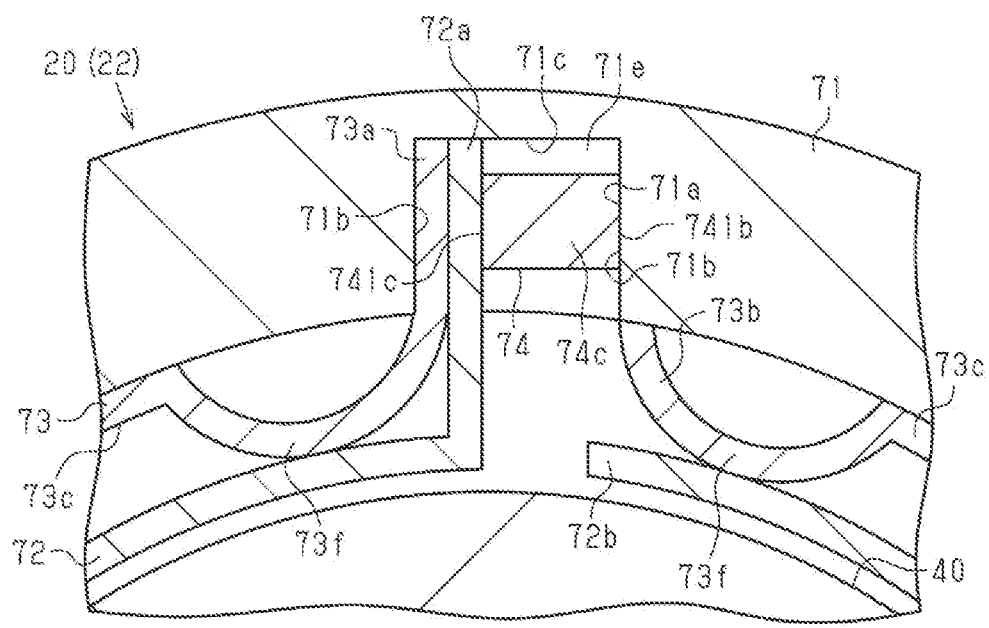
FIG. 6 is a detailed section view of a rotation stopper and surrounding parts.

As illustrated in FIG. 6, the sandwiching surfaces 741*c* extend along the respective side surfaces 71*b* of the holding groove 71*a*. The rotation stopper 74*c* is inserted into the holding groove 71*a* with the one of the pair of the sandwiching surfaces 741*c* in contact with one of the pair of the side surfaces 71*b* of the holding groove 71*a* and the other of the pair of the sandwiching surfaces 741*c* in contact with the fixed end portion 72*a* of the top foil 72. The rotation stopper 74*c* inserted into the holding groove 71*a* interposes the fixed end portion 72*a* of the top foil 72 and the fixed end portion 73*a* of the bump foil 73 cooperatively with the other of the pair of the side surfaces 71*b* of the holding groove 71*a*. In other words, the rotation stopper 74*c* inserted into the holding groove 71*a* interposes the part of the top foil 72 and the part of the bump foil 73 cooperatively with the side surface 71*b* of the holding groove 71*a*. Therefore, the centrifugal compressor 10 further includes the rotation stopper 74*c* formed integrally with the main body 74*a*.

Figure 7:
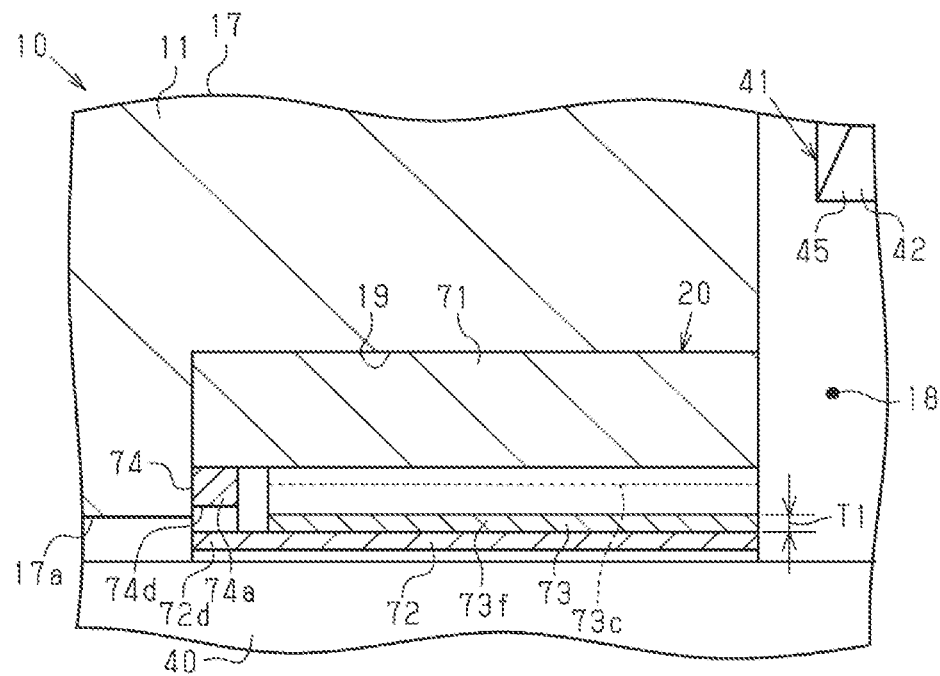
FIG. 7 is a detailed section view of the first foil bearing and surrounding parts.

As illustrated in FIG. 7, the holding member 74 disposed inside the bearing housing 71 of the first foil bearing 20 is positioned on a side inside the bearing housing 71 opposite to the electric motor 41. Therefore, the main body 74*a* of the holding member 74 protruding from the inner peripheral surface of the bearing housing 71 of the first foil bearing 20 protrudes from a portion of the inner peripheral surface of the bearing housing 71 on a side opposite to the electric motor 41.

Figure 8:
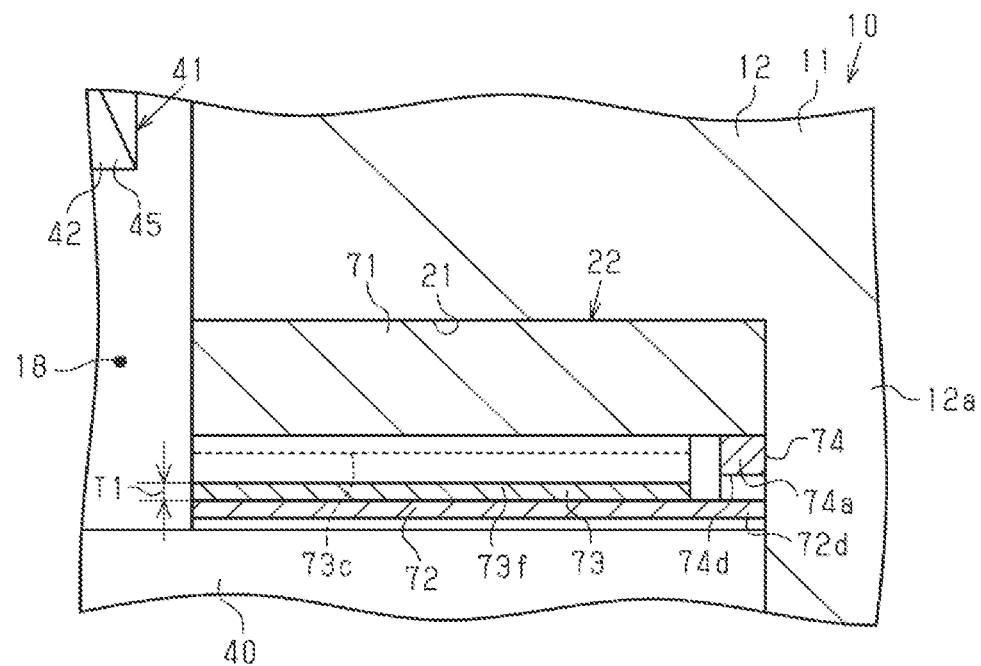
FIG. 8 is a detailed section view of a second foil bearing and surrounding parts.

As illustrated in FIG. 8, the holding member 74 disposed inside the bearing housing 71 of the second foil bearing 22 is positioned on a side inside the bearing housing 71 opposite to the electric motor 41. Therefore, the main body 74*a* of the holding member 74 protruding from the inner peripheral surface of the bearing housing 71 of the second foil bearing 22 protrudes from the portion of the inner peripheral surface of the bearing housing 71 on the side opposite to the electric motor 41.

Therefore, the main bodies 74*a* of the holding members 74 protrude from the portions of the respective inner peripheral surfaces of the bearing housings 71 of the first foil bearing 20 and the second foil bearing 22 on the respective sides opposite to the electric motor 41.

A protrusion amount of the main body 74*a* of the holding member 74 from the inner peripheral surface of the bearing housing 71 is set for an amount by which deformations of the raised portions 73*f* are restricted to the elastic range so as not to reach the plastic range. Therefore, the main body 74*a* of the holding member 74 restricts the deformations of the raised portions 73*f* to the elastic range so as not to reach the plastic range. The protrusion amount of the main body 74*a* of the holding member 74 from the inner peripheral surface of the bearing housing 71 is greater than a thickness T1 of the bump foil 73. The bump foil 73, without the main body 74*a*, for example, is set to have a spring constant at which the bump foil 73 is deformable from the elastic range to the plastic range.

As illustrated in FIG. 1, the centrifugal compressor 10 includes a disk-shaped support plate 75 provided to the rotary shaft 40. The support plate 75 protrudes from an outer peripheral surface of the rotary shaft 40. The support plate 75 is press-fitted into the outer peripheral surface of the rotary shaft 40. The support plate 75 rotates integrally with the rotary shaft 40. The support plate 75 is disposed in the thrust bearing accommodating chamber 25.

A thrust bearing 80 is disposed between the first intermediate housing 16 and the support plate 75, and another thrust bearing 80 is disposed between the second intermediate housing 17 and the support plate 75. When the support plate 75 rotates as the rotary shaft 40 rotates, dynamic pressures are generated between the support plate 75 and the respective thrust bearings 80. As a result, the support plate 75 floats from the thrust bearings 80, so that the thrust bearings 80 rotatably support the support plate 75 without contact with the support plate 75. Therefore, the thrust bearings 80 are aerodynamic bearings that rotatably support the rotary shaft 40 in the thrust direction.

In the centrifugal compressor 10, air is taken into the motor chamber 18 through the inlet hole 12*h*. The air taken into the motor chamber 18 passes through the communication holes 23, the thrust bearing accommodating chamber 25, the communication holes 16*b*, and inside of the second chamber forming recess 16*c*, to be taken into the first inlet 24. The air taken into the first inlet 24 increases in pressure by a centrifugal force of the first impeller 51, is then sent from the first impeller chamber 28 into the first diffuser flow passage 30, and further increases in pressure in the first diffuser flow passage 30. The air passing through the first diffuser flow passage 30 is discharged into the first discharge chamber 29.

The air discharged into the first discharge chamber 29 passes from the first discharge chamber 29 through a passage (not illustrated), to be taken into the second inlet 32. The air taken into the second inlet 32 increases in pressure by a centrifugal force of the second impeller 52, is then sent from the second impeller chamber 33 into the second diffuser flow passage 35, and further increases in pressure in the second diffuser flow passage 35. The air passing through the second diffuser flow passage 35 is discharged into the second discharge chamber 34.

Operations of the embodiment will now be described below.

For example, the top foil 72 may be displaced outwardly in the radial direction of the bearing housing 71 owing to vibrations of the rotary shaft 40, and then the raised portions 73f of the bump foil 73 in contact with the outer peripheral surface of the top foil 72 may be excessively pressed by the top foil 72. At that time, the abutment surface 74d of the main body 74a of the holding member 74 abuts against the outer peripheral surface of the top foil 72, which restricts the deformations of the raised portions 73f of the bump foil 73 to the elastic range so as not to reach the plastic range. In this way, even when, for example, the top foil 72 is displaced outwardly in the radial direction of the bearing housing 71 owing to the vibrations of the rotary shaft 40, the abutment surface 74d of the main body 74a of the holding member 74 abuts against the outer peripheral surface of the top foil 72, which restricts the deformations of the raised portions 73f of the bump foil 73 to the elastic range so as not to reach the plastic range.

Even when, for example, the top foil 72 and the bump foil 73 move toward the opening of the bearing housing 71 on the one side in the axial direction, the second edge 722c of the top foil 72 and the fixed end portion 73a of the bump foil 73 abut against the one portion of the main body 74a. This reduces a likelihood that the top foil 72 and the bump foil 73 escape from the opening of the bearing housing 71 on the one side in the axial direction.

Even when, for example, the top foil 72 and the bump foil 73 move toward an opening of the bearing housing 71 on the other side of the bearing housing 71 in the axial direction, the fixed end portion 72a of the top foil 72 and the fixed end portion 73a of the bump foil 73 abut against the stepped surface 71e. This reduces a likelihood that the top foil 72 and the bump foil 73 escape from the opening of the bearing housing 71 on the other side of the bearing housing 71 in the axial direction.

For example, the top foil 72 and the bump foil 73 may move in the circumferential direction of the bearing housing 71. Even in this case, since the fixed end portion 72a of the top foil 72 and the fixed end portion 73a of the bump foil 73 are interposed between the side surface 71b of the holding groove 71a and the rotation stopper 74c, movements of the top foil 72 and the bump foil 73 are restricted in the circumferential direction of the bearing housing 71.

The above-described embodiment offers the advantageous effects described below.

(1) For example, even when the top foil 72 is displaced outwardly in the radial direction of the bearing housing 71 owing to the vibrations of the rotary shaft 40, the abutment surface 74d of the main body 74a of the holding member 74 abuts against the outer peripheral surface of the top foil 72, which restricts the deformation of the bump foil 73 to the elastic range so as not to reach the plastic range. Since a likelihood of the plastic deformation of the bump foil 73 is reduced, a likelihood that the first foil bearing 20 and the second foil bearing 22 fail to rotatably support the rotary shaft 40 is reduced. As a result, reliability of the centrifugal compressor 10 is increased.

(2) The main body 74a is disposed between the outer peripheral surface of the non-overlapped portion 72d of the top foil 72 and the inner peripheral surface of the bearing housing 71. The position of the main body 74a in the above configuration is suitable for the protrusion that protrudes inwardly in the radial direction of the bearing housing 71 from the inner peripheral surface of the bearing housing 71.

(3) The main body 74a of the holding member 74 is disposed at the opening of the bearing housing 71, and the one portion of the main body 74a overlaps with the part of the top foil 72 and the part of the bump foil 73 in the axial direction of the bearing housing 71. In the above configuration, even when, for example, the top foil 72 and the bump foil 73 move toward the opening of the bearing housing 71, the part of the top foil 72 and the part of the bump foil 73 abut against the one portion of the main body 74a. Therefore, the main body 74a reduces a likelihood that the top foil 72 and the bump foil 73 escape from the bearing housing 71 in the axial direction. In other words, the main body 74a of the holding member 74 configured to restrict the deformation of the bump foil 73 to the elastic range so as not to reach the plastic range also functions as a stopper for preventing the top foil 72 and the bump foil 73 from escaping from the bearing housing 71. Since the main body 74a of the holding member 74 reduces the likelihood that the top foil 72 and the bump foil 73 escape from the bearing housing 71, the first foil bearing 20 and the second foil bearing 22 rotatably support the rotary shaft 40 in a stable manner, which further increases the reliability of the centrifugal compressor 10.

(4) The centrifugal compressor 10 further includes the rotation stopper 74c that is formed integrally with the main body 74a of the holding member 74 and inserted into the holding groove 71a to interpose the part of the top foil 72 and the part of the bump foil 73 cooperatively with the side surface 71b of the holding groove 71a. In the above configuration, even when, for example, there is a likelihood that the top foil 72 and the bump foil 73 move in the circumferential direction of the bearing housing 71, the part of the top foil 72 and the part of the bump foil 73 are interposed between the side surface 71b of the holding groove 71a and the rotation stopper 74c. This reduces the likelihood that the top foil 72 and the bump foil 73 move in the circumferential direction of the bearing housing 71. This eliminates necessity to separately provide a rotation stopper as a different member from the main body 74a of the holding member 74, which simplifies the configuration. Since the rotation stopper 74c reduces the likelihood that the top foil 72 and the bump foil 73 move in the circumferential direction of the bearing housing 71, the first foil bearing 20 and the second foil bearing 22 rotatably support the rotary shaft 40 in a stable manner, which further increases the reliability of the centrifugal compressor 10.

(5) For example, if the rotary shaft 40 generates the vibrations, the vibration amplitude of the rotary shaft 40 inside the bearing housing 71 increases at a portion farther from the electric motor 41. When the rotary shaft 40 generates the vibrations, a deformation amount of the bump foil 73 is likely to increase at a portion farther from the electric motor 41. However, the main body 74a of the holding member 74 protrudes from the portion of the inner peripheral surface of the bearing housing 71 located on the side opposite to the electric motor 41. Thus, the main body 74a of the holding member 74 easily restricts the deformation of the bump foil 73 at a portion farther from the electric motor 41 to the elastic range so as not to reach the plastic range. Since the likelihood of the plastic deformation of the bump foil 73 is reduced, the likelihood that the first foil bearing 20 and the second foil bearing 22 fail to rotatably support the rotary shaft 40 is reduced. As a result, the reliability of the centrifugal compressor 10 is increased.

(6) The main bodies 74a of the holding members 74 protrude from the portions of the respective inner peripheral surfaces of the bearing housings 71 of the first foil bearing 20 and the second foil bearing 22 located on the respective sides opposite to the electric motor 41. In the above configuration, even when, for example, the rotary shaft 40 generates the vibrations, the main bodies 74a of the holding members 74 easily restrict the deformations of the bump foils 73 of the first foil bearing 20 and the second foil bearing 22 at portions farther from the electric motor 41 to the elastic range so as not to reach the plastic range. Therefore, the first foil bearing 20 and the second foil bearing 22 rotatably support the rotary shaft 40 in a stable manner, which further increases the reliability of the centrifugal compressor 10.

(7) The part of the main body 74a of the holding member 74 is disposed at the positions corresponding to the respective raised portions 73f in the inner peripheral surface of the bearing housing 71. The above configuration easily restricts the deformation of the bump foil 73 to the elastic range so as not to reach the plastic range, comparing to a case where, for example, the main body 74a is not disposed at the positions corresponding to the respective raised portions 73f in the inner peripheral surface of the bearing housing 71 but is disposed at positions corresponding to the respective bottom portions 73c.

(8) When the raised portions 73f of the bump foil 73 are pressed by the top foil 72, the pressed raised portions 73f are deformed, and the deformation is transmitted along the bump foil 73 in the circumferential direction of the bearing housing 71 from the fixed end portion 73a as a start point. The raised portions 73f are more easily deformed at positions on the side closer to the free end portion 73b. However, the part of the main body 74a of the holding member 74 is disposed at the position corresponding to the one of the raised portions 73f located on the side close to the free end portion 73b of the bump foil 73 in the inner peripheral surface of the bearing housing 71. In the above configuration, even when, for example, the top foil 72 is displaced outwardly in the radial direction of the bearing housing 71 owing to the vibrations of the rotary shaft 40, the deformations of the raised portions 73f at the positions on the side close to the free end portion 73b at which the deformations more easily occur are easily restricted to the elastic range so as not to reach the plastic range by the main body 74a of the holding member 74. Since the likelihood of the plastic deformation of the bump foil 73 is reduced, the likelihood that the first foil bearing 20 and the second foil bearing 22 fail to rotatably support the rotary shaft 40 is reduced. As a result, the reliability of the centrifugal compressor 10 is increased.

(9) The main body 74a of the holding member 74 has a ring shape and extends over an entire circumference of the inner peripheral surface of the bearing housing 71. In this configuration, the main body 74a of the holding member 74 restricts the deformations of all the raised portions 73f to the elastic range so as not to reach the plastic range, which easily reduces the likelihood of plastic deformation of the bump foil 73. Therefore, the likelihood that the first foil bearing 20 and the second foil bearing 22 fail to rotatably support the rotary shaft 40 is reduced further, which further increases the reliability of the centrifugal compressor 10.

(10) Since the main body 74a of the holding member 74 reduces the likelihood of the plastic deformation of the bump foil 73, movement of the first impeller 51 and the second impeller 52 is reduced even when, for example, the rotary shaft 40 generates the vibrations or the centrifugal compressor 10 itself generates vibrations. This eliminates necessity to ensure a certain tip clearance between the first impeller 51 and the housing 11 and a certain tip clearance between the second impeller 52 and the housing 11 for preventing an outer periphery of the first impeller 51 from colliding with the housing 11 and an outer periphery of the second impeller 52 from colliding with the housing 11. Therefore, deterioration in compression efficiency of the centrifugal compressor 10 is reduced.

The following modifications may be made to the above-described embodiment. The above-described embodiment and the following modifications may be combined with one another unless otherwise fallen into technical inconsistency.

Figure 9:
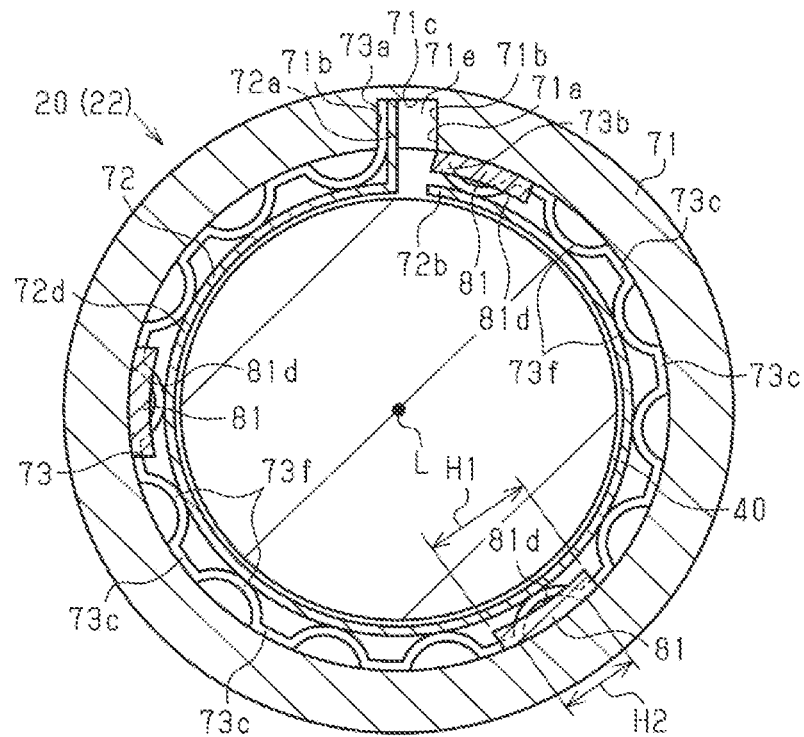
FIG. 9 is a section view of protrusions according to another embodiment of the present disclosure.

As illustrated in FIG. 9, a plurality of protrusions 81 may protrude inwardly in the radial direction from parts of the inner peripheral surface of the bearing housing 71. The protrusions 81 are disposed at the opening of the bearing housing 71 on the one side of the bearing housing 71 in the axial direction. The protrusions 81 are disposed at positions corresponding to associated raised portions 73f in the inner peripheral surface of the bearing housing 71 when viewed in the axial direction of the bearing housing 71. The protrusions 81 are disposed adjacent to the bump foil 73 in the axial direction. The protrusions 81 are disposed between the outer peripheral surface of the non-overlapped portion 72d of the top foil 72 and the inner peripheral surface of the bearing housing 71.

The embodiment illustrated in FIG. 9 includes three protrusions 81 protruding from the inner peripheral surface of the bearing housing 71. Therefore, the plurality of protrusions 81 of the embodiment illustrated in FIG. 9 is protruding from the parts of the inner peripheral surface of the bearing housing 71 and disposed at intervals in the circumferential direction. End surfaces of the protrusions 81 in the protruding direction correspond to abutment surfaces 81d that restrict the deformation of the bump foil 73 to the elastic range so as not to reach the plastic range by abutting against the outer peripheral surface of the top foil 72 when the top foil 72 is displaced outwardly in the radial direction of the bearing housing 71. Therefore, each of the protrusions 81 includes the abutment surface 81d. The abutment surface 81d of the protrusion 81 is formed in an arc so as to extend along the shape of the top foil 72 when the top foil 72 is displaced. A width H1 of each protrusion 81 in the circumferential direction of the bearing housing 71 is greater than a width H2 of each raised portion 73f in the circumferential direction of the bearing housing 71.

In the above-described configuration, the stiffness of the protrusions 81 is enhanced as compared to a case where, for example, the width H1 of each protrusion 81 in the circumferential direction of the bearing housing 71 is smaller than the width H2 of each raised portion 73f in the circumferential direction of the bearing housing 71. Thus, the protrusions 81 easily restrict the deformations of the raised portions 73f to the elastic range so as not to reach the plastic range. Therefore, the first foil bearing 20 and the second foil bearing 22 rotatably support the rotary shaft 40 in a stable manner, which further increases the reliability of the centrifugal compressor 10.

Figure 10:
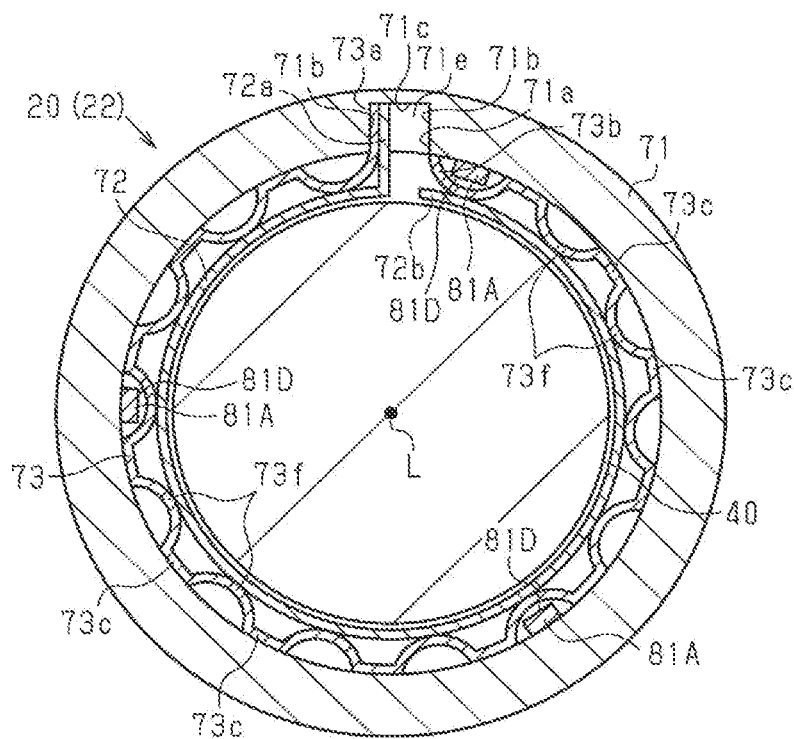
FIG. 10 is a section view of protrusions according to yet another embodiment of the present disclosure.

As illustrated in FIG. 10, protrusions 81A need not be disposed at the opening of the bearing housing 71 and need not overlap with parts of the top foil 72 and parts of the bump foil 73 in the axial direction of the bearing housing 71. The protrusions 81A may be disposed between the inner peripheral surface of the bearing housing 71 and the associated raised portions 73f. In this case, the protrusions 81A are not disposed adjacent to the bump foil 73 in the axial direction. As described above, the protrusions 81A need not be disposed adjacent to the bump foil 73 in the axial direction and need not be disposed between the outer peripheral surface of the non-overlapped portion 72d of the top foil 72 and the inner peripheral surface of the bearing housing 71. End surfaces of the protrusions 81A in the protruding direction correspond to abutment surfaces 81D that restrict the deformation of the bump foil 73 to the elastic range so as not to reach the plastic range by abutting against an outer peripheral surface of the bump foil 73 corresponding to an outer surface of the bump foil 73 when the top foil 72 is displaced outwardly in the radial direction of the bearing housing 71. Therefore, each of the protrusions 81A includes the abutment surface 81D.

For example, the top foil 72 may be displaced outwardly in the radial direction of the bearing housing 71 owing to the vibrations of the rotary shaft 40, and then the raised portions 73f of the bump foil 73 in contact with the outer peripheral surface of the top foil 72 may be excessively pressed by the top foil 72. At that time, the abutment surfaces 81D of the protrusions 81A abut against the outer peripheral surface of the bump foil 73, which restricts the deformation of the bump foil 73 to the elastic range so as not to reach the plastic range.

In the embodiment, the centrifugal compressor 10 need not include the rotation stopper 74c.

In the embodiment, the main body 74a of the holding member 74 may protrude from a portion of the inner peripheral surface of the bearing housing 71 located on a side close to the electric motor 41, instead of protruding from the portion of the inner peripheral surface of the bearing housing 71 located on the side opposite to the electric motor 41.

In the embodiment, the main body 74a of the holding member 74 protrudes from the portion of the inner peripheral surface of the bearing housing 71 located on the side opposite to the electric motor 41, and may also protrude from the portion of the inner peripheral surface of the bearing housing 71 located on the side close to the electric motor 41.

In the embodiment, as to the main body 74a of the holding member 74 that protrudes from the inner peripheral surface of the bearing housing 71 of one of the first foil bearing 20 and the second foil bearing 22, the main body 74a may protrude from the portion of the inner peripheral surface of the bearing housing 71 located on the side close to the electric motor 41.

In the embodiment, the main body 74a of the holding member 74 need not protrude from the position corresponding to the one of the raised portions 73f of the bump foil 73 located on the side close to the free end portion 73b of the bump foil 73 in the inner peripheral surface of the bearing housing 71 when viewed in the axial direction of the bearing housing 71.

In the embodiment, a ring-shaped protrusion corresponding to the main body 74a of the holding member 74 may be formed integrally with the inner peripheral surface of the bearing housing 71. In other words, the centrifugal compressor 10 need not have the main body 74a of the holding member 74 provided by a separate member from the bearing housing 71 so as to correspond to the ring-shaped protrusion.

In the embodiment, the bump foil 73 need not have the cylindrical shape, but may have, for example, a plate shape curved in an arc. The centrifugal compressor 10 may have a configuration in which a plurality of bump foils 73 each having the plate-shape curved in the arc is arranged along the inner peripheral surface of the bearing housing 71 in the circumferential direction.

In the embodiment, for example, two bump foils 73 may be arranged adjacent to each other in the axial direction of the bearing housing 71 between the inner peripheral surface of the bearing housing 71 and the top foil 72. The bump foils 73 adjacent to each other in the axial direction of the bearing housing 71 may be distanced from each other in the axial direction of the bearing housing 71. In this case, a portion of the top foil 72 that overlaps with the space between the two bump foils 73 in the radial direction of the bearing housing 71 is a non-overlapped portion that extends longer in the axial direction of the bearing housing 71 than the two bump foils 73 and that is not overlapped with the bump foils 73 in the radial direction of the bearing housing 71. Then, the protrusion protruding inwardly in the radial direction from the inner peripheral surface of the bearing housing 71 may be disposed between the outer peripheral surface of the non-overlapped portion and the inner peripheral surface of the bearing housing 71.

In the embodiment, the protrusion protruding inwardly in the radial direction from the inner peripheral surface of the bearing housing 71 may be disposed at positions corresponding to the respective bottom portions 73c in the inner peripheral surface of the bearing housing 71, instead of the positions corresponding to the respective raised portions 73f.

In the embodiment, the centrifugal compressor 10 need not include, for example, the second impeller 52.

In the embodiment, the fluid that the first impeller 51 and the second impeller 52 compress is not limited to air. The centrifugal compressor 10 may be used for any object, and may compress any fluid. For example, the centrifugal compressor 10 may be used for an air conditioning device, and may compress a refrigerant. In addition, the centrifugal compressor 10 may be mounted on any object, not limited to a vehicle.

In the embodiment, the fluid machine may adopt a scroll compressor including a scroll mechanism as the operation body configured to discharge the fluid by rotation of the rotary shaft. Alternatively, the fluid machine may adopt a roots pump including two rotors as the operation body.

What is claimed is:

1. A fluid machine, comprising:
a rotary shaft;
an operation body configured to discharge fluid by rotation of the rotary shaft;
a housing accommodating the rotary shaft and the operation body; and
a foil bearing disposed in the housing and rotatably supporting the rotary shaft, the foil bearing including:

a bearing housing having a cylindrical shape and including an inner peripheral surface, wherein the inner peripheral surface forms an inner peripheral circle of the bearing housing;

a top foil disposed between the inner peripheral surface of the bearing housing and the rotary shaft; and a bump foil disposed between the inner peripheral surface of the bearing housing and the top foil and elastically supporting the top foil, wherein the bearing housing has a protrusion that protrudes inwardly in a radial direction of the bearing housing from the inner peripheral surface of the bearing housing, the protrusion includes an abutment surface configured to restrict deformation of the bump foil to an elastic range so as not to reach a plastic range by abutting against an outer surface of the top foil or an outer surface of the bump foil when the top foil is displaced outwardly in the radial direction of the bearing housing, and the protrusion protrudes more inwardly in the radial direction of the bearing housing than the inner peripheral circle of the bearing housing.

2. The fluid machine according to claim 1, wherein the top foil has a non-overlapped portion that extends longer in an axial direction of the bearing housing than the bump foil and that is not overlapped with the bump foil in the radial direction of the bearing housing, and the protrusion is disposed adjacent to the bump foil in the axial direction and between an outer surface of the non-overlapped portion and the inner peripheral surface of the bearing housing.

3. The fluid machine according to claim 1, wherein the protrusion is disposed at an opening of the bearing housing, and a portion of the protrusion overlaps with a part of the top foil and a part of the bump foil in the axial direction of the bearing housing.

4. The fluid machine according to claim 1, wherein the bearing housing has a holding groove in the inner peripheral surface of the bearing housing, the part of the top foil and the part of the bump foil are inserted into the holding groove, and the fluid machine further includes a rotation stopper that is formed integrally with the protrusion and inserted into the holding groove to interpose the part of the top foil and the part of the bump foil cooperatively with a side surface of the holding groove.

5. The fluid machine according to claim 1, wherein the fluid machine includes an electric motor configured to rotate the rotary shaft, and the protrusion protrudes from a portion of the inner peripheral surface of the bearing housing located on a side opposite to the electric motor.

6. The fluid machine according to claim 5, wherein the foil bearing includes a first foil bearing and a second foil bearing between which the electric motor is interposed in an axial direction of the rotary shaft, and the protrusion of each of the first foil bearing and the second foil bearing protrudes from the portion of the inner peripheral surface of the bearing housing located on the side opposite to the electric motor.

7. The fluid machine according to claim 1, wherein the bump foil has a cylindrical shape, the bump foil includes:

a bottom portion that is in contact with the inner peripheral surface of the bearing housing; and a raised portion that is in contact with an outer peripheral surface of the top foil and is elastically deformable along with outward displacement of the top foil in the radial direction of the bearing housing, and the protrusion is disposed in the inner peripheral surface of the bearing housing at a circumferential position corresponding to the raised portion.

8. The fluid machine according to claim 7, wherein the bump foil includes:

a fixed end portion that is one end portion of the bump foil in a circumferential direction of the bump foil; and a free end portion that is the other end portion of the bump foil in the circumferential direction of the bump foil, a plurality of the bottom portions and a plurality of the raised portions are alternately arranged in a circumferential direction of the bearing housing from the fixed end portion toward the free end portion of the bump foil, and the protrusion is disposed at a position corresponding to the raised portion located on a side close to the free end portion of the bump foil in the inner peripheral surface of the bearing housing.

9. The fluid machine according to claim 1, wherein the protrusion has a ring shape, and the protrusion extends over an entire circumference of the inner peripheral surface of the bearing housing.

10. The fluid machine according to claim 7, wherein the bottom portion is one of a plurality of bottom portions and the raised portion is one of a plurality of raised portions, each respective bottom portion being alternately arranged with each respective raised portion in a circumferential direction of the bearing housing, the protrusion is one of a plurality of protrusions, each respective protrusion protruding from a respective portion of the inner peripheral surface of the bearing housing at spaced intervals in a circumferential direction of the bearing housing, and a width of each protrusion in the circumferential direction of the bearing housing is greater than a width of each raised portion in the circumferential direction of the bearing housing.

\* \* \* \* \*